United States Patent [19]
Shavit

[11] 3,979,922
[45] Sept. 14, 1976

[54] ENERGY CONSERVATION AIR CONDITIONING SYSTEM

[75] Inventor: Gideon Shavit, Highland Park, Ill.

[73] Assignee: Honeywell Inc., Minneapolis, Minn.

[22] Filed: Dec. 30, 1974

[21] Appl. No.: 537,301

[52] U.S. Cl. .................................. 62/97; 62/176; 165/16
[51] Int. Cl.² ................... F24F 11/02; G05D 27/00
[58] Field of Search ............... 165/16; 236/91, 1 B, 236/1 C; 62/179, 412, 176, 97

[56] References Cited
UNITED STATES PATENTS

| | | | |
|---|---|---|---|
| 2,258,021 | 10/1941 | Locke | 165/16 |
| 2,318,706 | 5/1943 | Newton | 165/16 |
| 2,372,839 | 4/1945 | McGrath | 165/16 |

*Primary Examiner*—William E. Wayner
*Attorney, Agent, or Firm*—Trevor B. Joike

[57] ABSTRACT

A system is disclosed for minimizing the energy consumption of an air conditioning system by selecting the position of the outside air damper which will require the lowest total energy input into the system. The system includes sensors for generating signals dependent upon the temperature and humidity of the outdoor air, return air and discharge air, a damper position controller for generating a damper position signal dependent upon these outputs and a control means for receiving said damper position signal for adjusting the position of the outdoor air damper at a position requiring the lowest total energy input into the system for establishing a desired set of conditions.

18 Claims, 15 Drawing Figures

```
 10: *HUMID LARGE
 20:       DIMENSION Q(21), F(216)
 30:       AMIN=.2
 40:       K=0
 50:       READ(9,1) NP
 60:    1  FORMAT(I5)
 65:       KI NP*9
 70:       KALL DEFINE(1,"HIN,")
 80:       READ(1,10)(F(I),I=1,KI)
 90:       N=0
100:    3  N N+1
110:       IF(NP-N) 60,4,4

120:    4  HS=F(K+1)
130:       H4=F(K+2)
140:       AMAX=F(K+3)
150:       W1=F(K+4)
160:       W2=F(K+5)
170:       W4=F(K+6)
180:       T1=F(K+7)
190:       T2=F(K+8)
200:       T4=F(K+9)
210:       K=K+9
220:   10  FORMAT(279F8.4/)
230:       H4=0.24*T4+(1061.+0.45*T4)*W4
240:       WRITE(9,20) HS,H4,AMAX,W1,W2,W4,T1,T2,T4
250:   20  FORMAT(/,3HHS=F10.5,3X3HH4=F10.5,3X5HAMAX=F10.5,/,
260:      +3HW1=F10.5,3X3HW2=F10.5,5X3HW4=F10.5,/,
270:      +3HT1=F10.5,3X3HT2=F10.5,5X3HT4=F10.5,/)
280:       IF(W1-W4) 21,21,26

290:   26  A=1.0
300:       WRITE(9,27)
310:   27  FORMAT(2HA  F10.5/)
320:       GO TO 55

330:   21  I=0
340:       DA=(AMAX-AMIN)/20.
350:       A=AMIN
360:         DO 30 I=1,21
370:         T3=T1*A+(1.-A)*T2
380:         W3=W1*A+(1.-A)*W2
390:         H3P=H4-HS*(W4-W3)
400:         T3P=(H3P-1061.*W3)/(0.24+0.45*W3)
410:         Q(I)=ABS(HS*(W4-W3))+ABS(0.24*(T3-T3P))
411: *++A*0.24*(45.-T1)
420:         IF(W3-W4) 22,22,23

```
480:     24     WRITE(9,25) J,A,H3P,T3P,Q(I)
490:     25     FORMAT(I1,IX2HA=F10.5,3X,4HH3P=F10.5,3X,4HT3P=F10.5,3X,2
500:          + HQ=F10.5)
510:     29     A=A+DA
520:     30     CONTINUE
530:*           FIND MINIMUM Q
540:            IMIN=0
550:            QMIN=10000.
560:              DO 40 I=1,21
570:              IF(ABS(Q(I))-QMIN) 35,35,36
580:     35     QMIN=ABS(Q(I))
590:            IMIN=I
600:     36     CONTINUE
610:     40     CONTINUE
620:            A=(IMIN-1)*DA+AMIN
630:            WRITE(9,50) A,QMIN
640:     50     FORMAT(//,1X,2HA=F10.5,3X,5HQMIN=10.5)
650:     55     GO TO 3
660:     60     STOP
670:            END
```

ENERGY CONSERVATION AIR CONDITIONING SYSTEM

BACKGROUND OF THE INVENTION

This invention relates to the conservation of the energy necessary to maintain the desired conditions in a building air conditioning system.

A typical commercial building air conditioning system designed to maintain a desired temperature setting and a desired humidity setting in a plurality of zones may comprise an outdoor air duct and damper to supply a desired volume of fresh air to the system, a return air duct and damper to control the amount of return air mixed with the outdoor air, a cooling coil to reduce the humidity of the air and/or cool the air to a desired temperature, a fan for supplying the air to the zones, a humidifier for humidifying the air supplied to the zones and a separate reheat coil associated with each zone to bring the air to the zones to a desired temperature.

Additionally, the air conditioning systems designed to control the temperature and humidity of buildings located in the northern climates may also have preheat coils to protect the cooling coils from freezing. These preheat coils are located between the source of outdoor air and the cooling coil to insure that the air supplied to the cooling coil is always at some selected temperature above the freezing point. Thus, even though the outdoor air temperature drops below freezing, the air supplied to the cooling coil will always be above freezing. In climates where the outdoor air temperature does not fall below freezing, the preheat coil may be eliminated.

In early air conditioning systems, the outdoor air damper was manually set to admit a predetermined amount of fresh air into the building. It was soon realized, however, that if the outdoor air damper was not periodically adjusted according to outdoor air temperature variations, the amount of energy required to maintain the preset indoor conditions varied widely. The outdoor air damper was, as a result, automated to vary the amount of fresh air admitted into the building in accordance with the outdoor air temperature as sensed by a thermostat.

Temperature alone, however, does not determine the total heat capacity of a given volume of air as does enthalpy. Enthalpy is determined from both temperature and humidity. Controls were, therefore, designed to modulate the outdoor air damper according to both outdoor air temperature and humidity. But no system has controlled this damper at a position determined by the temperature and moisture content of the outdoor air, return air and the air discharged to the zones; and, no system has controlled the damper at a position requiring the lowest total energy input as a function of the above parameters to maintain the desired conditions of the discharge air.

SUMMARY OF THE INVENTION

The system disclosed herein is designed to operate the outside air damper at a position which will require the lowest total energy input into the system to maintain the desired conditions of the discharge air. The total energy input into the system is derived from the energy supplied to the pre-heat coil, the cooling coil, the humidifier and the reheat coils. In order to minimize the energy supplied to these devices to maintain the space conditions of the zones, the enthalpy, i.e. the heat content, of the outside air, the return air, the mixture of the outside and return air, and the discharge air which has been pre-heated, cooled and humidified must be determined in order to select the outdoor air damper position requiring the lowest amount of energy input into the system to bring about the desired conditions of the discharge air. The outdoor air damper is arranged to admit a minimum amount of outdoor air into the system, as dictated by typical code requirements, which amount establishes the lower limit of damper operation. The damper is then operated between its minimum position and its fully open position.

DETAILED DESCRIPTION

Figure 1:
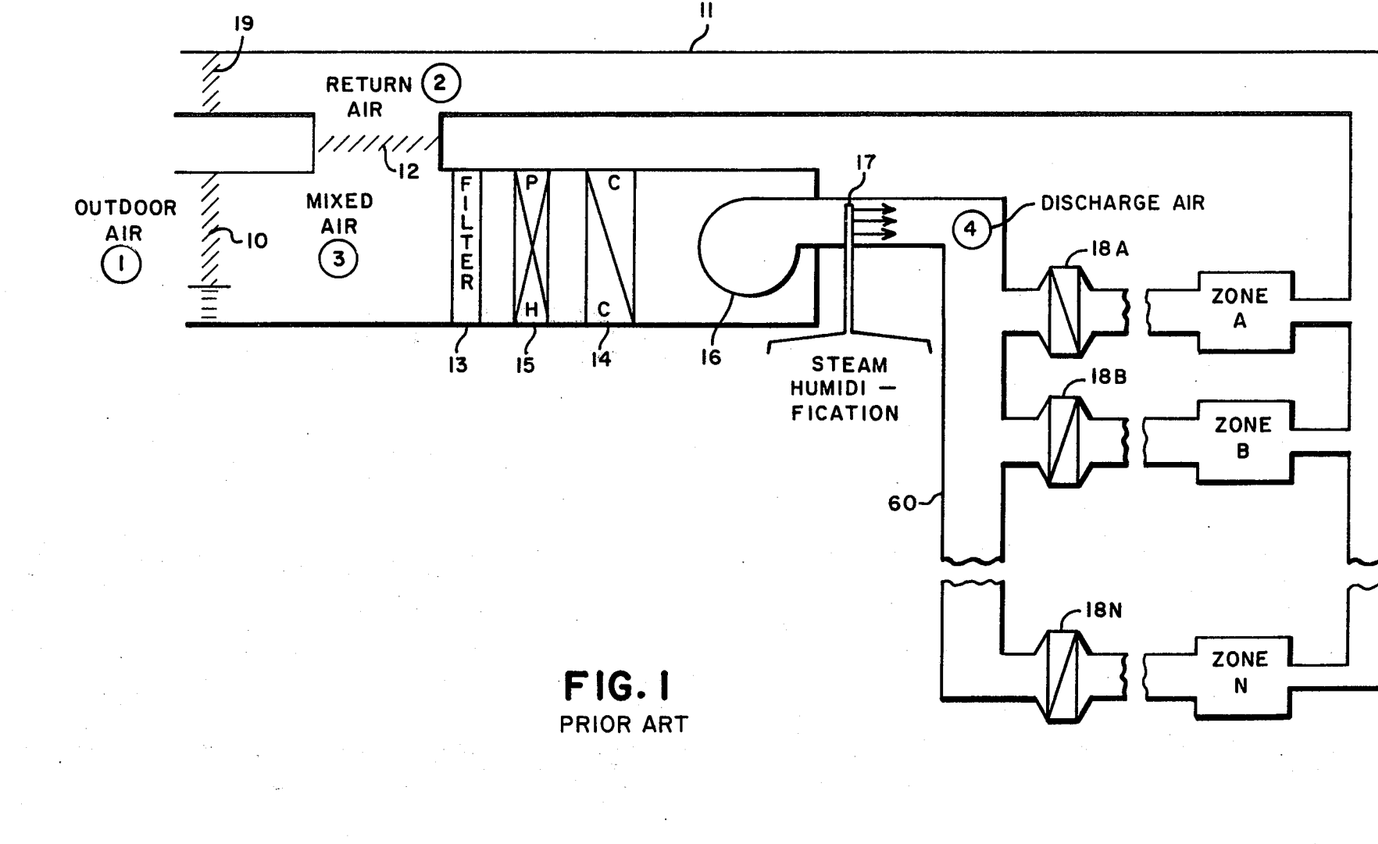
FIG. 1 shows a typical air conditioning system.

In FIG. 1 is shown a typical air conditioning system wherein outdoor air is drawn into the building through outdoor air damper 10 and is mixed with return air drawn through return air damper 12 from return air duct 11. The mixture of outdoor air and return air is then drawn through a filter 13. If the climate is one in which the cooling coil 14 is subject to freezing, i.e. in northern climates, a pre-heat coil 15 is used to insure that the air passed to the cooling coil is above freezing. In southern climates, where there is little chance of freezing conditions, there is little need for a pre-heat coil and it can be eliminated from the system. Since a pre-heat coil requires a certain amount of energy for its operation, a system without a pre-heat coil can function more efficiently and economically than a system having a pre-heat coil.

The air is then cooled by cooling coil 14 and drawn to a fan 16. The fan 16 supplies the treated air through a humidifier 17, which in this case is shown as a steam humidifier, and is discharged into duct 60 and supplied through a plurality of reheat coils 18A, 18B . . . 18N to zones A, B . . . N. The air in these zones A–N is drawn back through the return air duct 11 for remixing with outside air and a portion of the return air is expelled from the building through damper 19.

The pre-heat coil 15, cooling coil 14, humidifier 17 and reheat coils 18A, 18B . . . 18B each operate off of associated sensors. Generally, the pre-heat coil 15 is controlled from a sensor positioned to respond to the outdoor air temperature and/or air leaving the cooling coil, the cooling coil is controlled from a sensor positioned to respond to the cooled air, the humidifier is controlled from a sensor positioned in return air duct 11, and the reheat coils are controlled from sensors positioned in their respective zones.

Today's programs with respect to building air conditioning controls have been directed primarily to a determination of the size of the heating and the cooling devices which are needed to supply the zone. Very little attention, however, has been devoted to the proper operation and control of the mechanical systems themselves once they have been designed. This invention is, therefore, directed to the proper operation of a building air conditioning control system.

In order to properly regulate an air conditioning system, the amount of outdoor air drawn into the building must be properly determined. For many years, the selection of the amount of outdoor air drawn into the system was based only from a consideration of the outdoor sensible heat. Whenever the outdoor temperature was in the neighborhood of 55° F, the outdoor air damper was fully open; as the outdoor air temperature fell below 55° F, the return and outdoor air dampers were controlled such that the mixed air remained in the neighborhood of 55° F. Whenever the outdoor air temperature was above 55°F, the outdoor air damper was modulated toward the closed position such that, when the outdoor air exceeded the return air temperature, only a minimum amount of outdoor air was supplied into the air handling system. This type of control is more clearly shown in FIG. 2.

Figure 2:
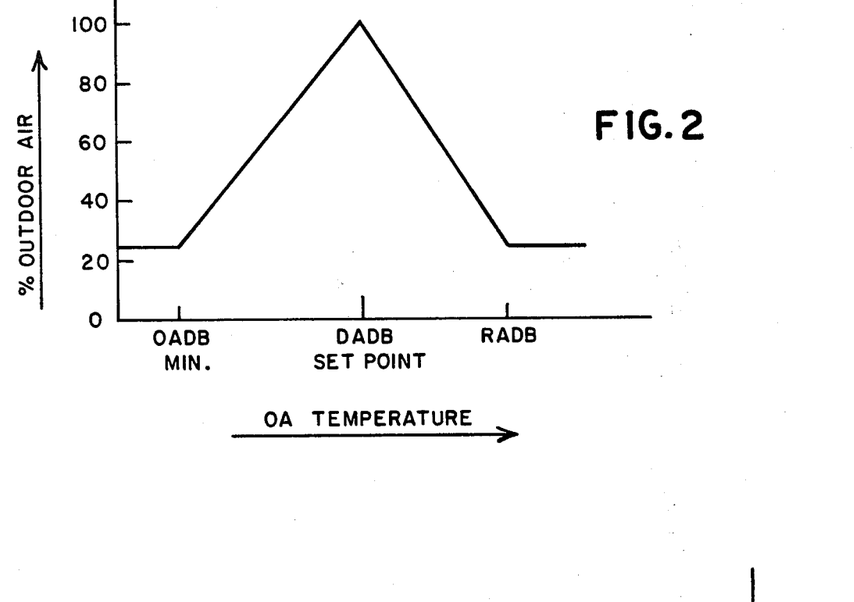
FIGS. 2–7 are charts demonstrating the effect that various portions of the air conditioning system have on the total operating system.

FIG. 2 illustrates that, when the outdoor air temperature was below a predetermined outside air dry bulb temperature, the outside air damper was controlled at a minimum setting. As the outdoor air temperature increased above that predetermined dry bulb temperature, the outdoor air damper was modulated until it was 100 percent open at the discharge air dry bulb set point temperature, i.e. 55° F in the above example. Above this temperature, the percent of outdoor air was then regulated down to a point where the outdoor air temperature exceeded the return air dry bulb temperature at which point the outdoor air damper was held at its minimum setting.

The disadvantages of this control system are that (A) it completely neglected the moisture content of the air such that, whenever the temperature of the outdoor air was above 55° F, the air supplied to the spaces was not necessarily the air with the minimum possible heat content and (B) it was found that whenever the outdoor air was between 55° F and the return air temperature, it was advantageous to use 100 percent outdoor air. This latter operation is referred to as the "economizer cycle."

Figure 3:
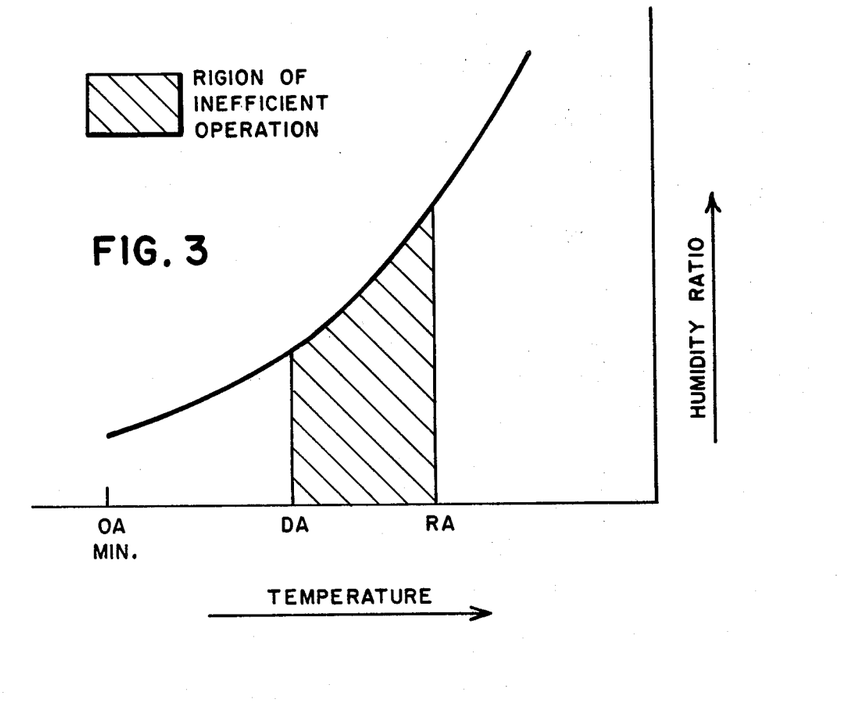

The simplified psychrometric chart shown in FIG. 3 shows the region of inefficient operation of the system following the operation shown in FIG. 2.

Figure 4:
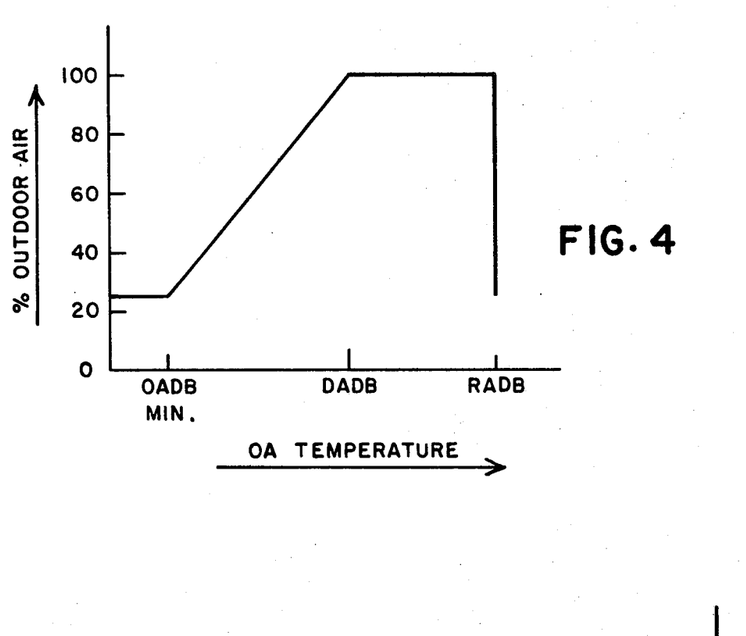

A system using the "economizers cycle" is shown in FIG. 4. When the outdoor air temperature reached the discharge air dry bulb temperature, the outdoor air damper was operated at 100 percent open until the outdoor air temperature exceeded the return air dry bulb temperature at which point the outdoor air damper was closed to its minimum setting.

The system operating according to the graph shown in FIG. 4 is inefficient because it fails to take into account the moisture content of the outdoor air. The region of inefficiency is shown in the psychrometric chart of FIG. 5.

Figure 5:
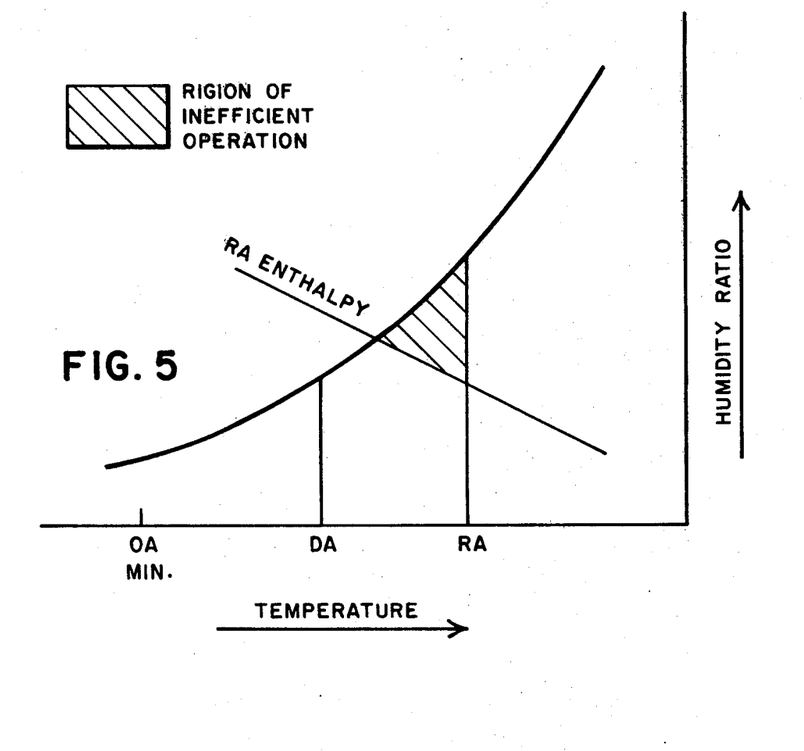

FIG. 5 indicates that if the enthalpy, i.e. the measure of the total heat content of the outdoor air and return air are considered, the result is that whenever the enthalpy of the outdoor air is greater than the enthalpy of the return air, the variable outdoor air damper should be set to its minimum position; whenever the outdoor enthalpy is lower than the return air enthalpy and the outdoor air temperature is less than the return air temperature, 100 percent outdoor air should be used; and, whenever the outdoor air temperature falls below the desired discharge air temperature, e.g. 55° F, the outdoor air damper should be modulated down to a minimum position in accordance with the economizer cycle.

Figure 6:
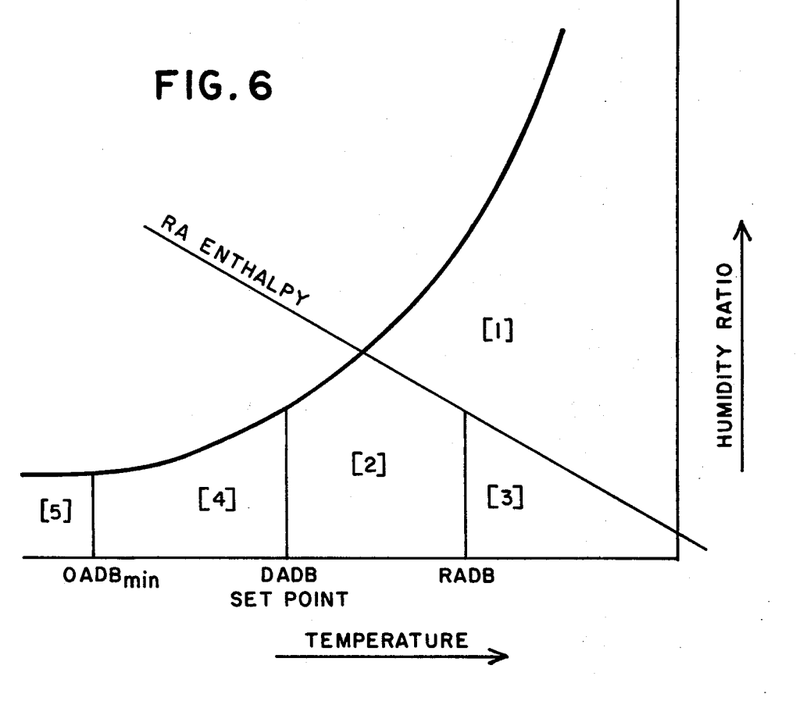

This operation is shown in FIG. 6 wherein region 1 is the region where only minimum outdoor air is used, region 2 is the region where 100 percent outdoor air is used, region 3 is the region where minimum outdoor air is used, region 4 is the region of damper modulation to provide the desired discharge air temperature from the air handling system, and region 5 is the region where the outdoor air temperature is so low that there is a danger of freezing the cooling coil and, therefore, only minimum outdoor air is used.

The systems described above take into account only the enthalpy of the outdoor air but not the enthalpy added to the air by humidification nor occupancy as well as any heat input due to a preheat coil if used.

The moisture addition to the air supply, humidification, is typically accomplished by one of two techniques. The first technique is to spray water on the cooling coil which is an envaporative type technique and changes the state of the air adiabatically (without loss or gain of heat). The more common technique is steam injection. Steam is derived by heating water to a sufficient temperature to produce water vapor and, therefore, must be considered as a heat input into the system. Thus, humidification with steam not only increases the moisture content of the air but also increases the dry bulb temperature of the air, and thus increases the energy input into the system.

The humidity in a conventional air handling system is controlled from the return air moisture content. Whenever the moisture content of the return air is below the upper limit, moisture is added to the discharge air. The control set point is reset in winter to avoid condensation on the windows.

The above discussion demonstrates that, in considering the total operation of the system, the temperature and moisture content of the outdoor air and discharge air as well as the return air must be considered when choosing an outdoor air damper position yielding the lowest total energy input in the system.

Figure 7:
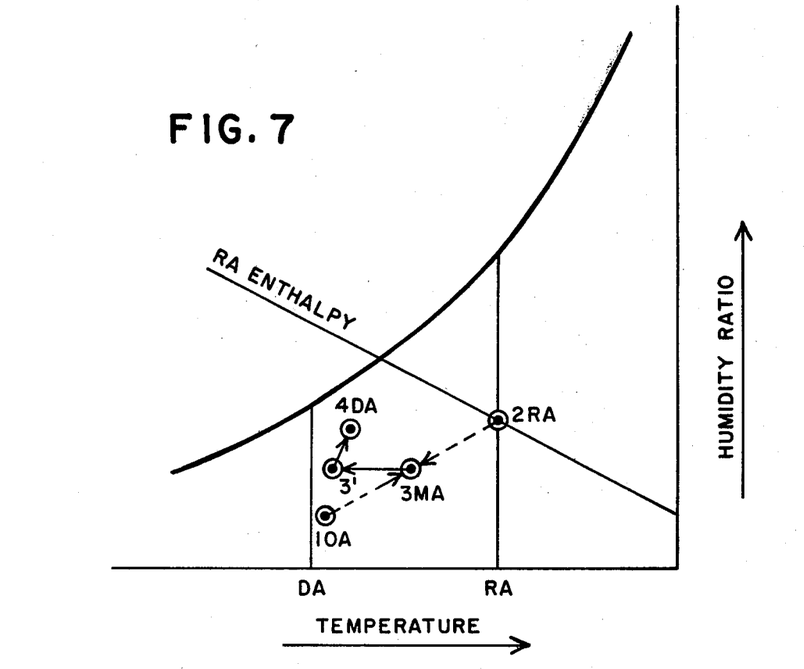

With the aid of the psychrometric chart in FIG. 7, the relationship between the outdoor air damper position and the temperature and moisture content of the outdoor air, return air, and discharge air can be established whereby the outdoor air damper position can be chosen to yield the lowest total energy input.

Enthalpy can be derived from the following expression:

$$h = C_{p,a}T_{DB} + (1,061 + C_{p,w}T_{DB})W \qquad 1.$$

where
$h$ = enthalpy,
$C_{p,a}$ = the specific heat of air at constant pressure,
$T_{DB}$ = dry bulb temperature, $C_{p,w}$ = the specific heat of water vapor at constant pressure and $W$ = moisture content per pound of dry air.

Humidifying air from a state A, air having the existing moisture content, to a state B, air having the desired moisture content, the following expression can be used:

$$h_B = h_A + q_s(W_B - W_A) \qquad 2.$$

where $h_B$ = the enthalpy of point B,
$h_A$ = the enthalpy of state A,
$q_s$ = the heat content of one pound of steam at a given pressure,
$W_A$ = the moisture content of state B,
$W_B$ = the moisture content of state A.

In the situation given in the psychrometric chart of FIG. 7, point 1 represents the measured state of outdoor air and point 2 respresents the measured state of return air. The dry bulb temperature and moisture content of the mixed air, i.e. the air at point 3, can be determined from the temperatures and moisture contents of return air and outdoor air by the following expressions:

$$T_3 = \alpha T_1 + (1-\alpha)T_2 \qquad 3.$$

$$W_3 = \alpha W_1 + (1-\alpha)W_2 \qquad 4.$$

where $\alpha$ = the percent of outdoor air introduced into the system.

These replationships will establish state 3 on the chart of FIG. 7. This mixed air now has to be cooled to state 3' such that after humidification, in this example steam, the final state is the desired discharge state, point 4. The cooling of the air from 3 to 3' requires only sensible cooling and the energy input into this system in BTU per pound of dry air is:

$$q_{3\text{-}3'} = C_{p,a}(T_3 - T_{3'}) \qquad 5.$$

where $q_{3\text{-}3'}$ = is the heat input per pound of dry air necessary to cool the air from 3 to 3'.

The energy input supplied into the system due to humidification changes the air from state 3 to state 4 and is determined by the following expression:

$$q_{3'\text{-}4} = h_4 - h_{3'} \qquad 6.$$

According to equation 2 above (interchanging $W_4$ for $W_B$ and $W_{3'}$ for $W_A$), the following expression can be obtained:

$$q_{3'\text{-}4} = q_s(W_4 - W_3) \qquad 7.$$

Using equation 6 and 7 above, the enthalpy at 3' can be described by the following equation:

$$h_{3'} = h_4 - q_s(W_4 - W_3) \qquad 8.$$

Using equation 1 and subsituting the appropriate subscripts, $T_{3'}$ can be determined by the following equation:

$$T_{3'} = (h_{3'} - 1,061\, W_3)/(C_{p,a} + C_{p,w}W_3) \qquad 9.$$

Finally, from equations 5 and 7, the total energy input, Q, into the system necessary to raise the temperature and humidity of the air from the mixed air combination of outdoor air and return air, point 3, to the desired conditions, point 4, requires a total energy input according to the following expression:

$$Q = C_{p,a}(T_3 - T_{3'}) + q_s(W_4 - W_3). \qquad 10.$$

Investigation of the above equations reveals that the minimization problem of the energy consumption has only one degree of freedom, the percent of outdoor air, $\alpha$. Thus the minimization procedure is a problem with one free variable for given outdoor air, return air and discharge air conditions. Thus, by assuming vaues of $\alpha$ in the permissible range and obtaining the minimum total energy input, Q, the optimum outdoor air damper position may be determined.

Figure 8:
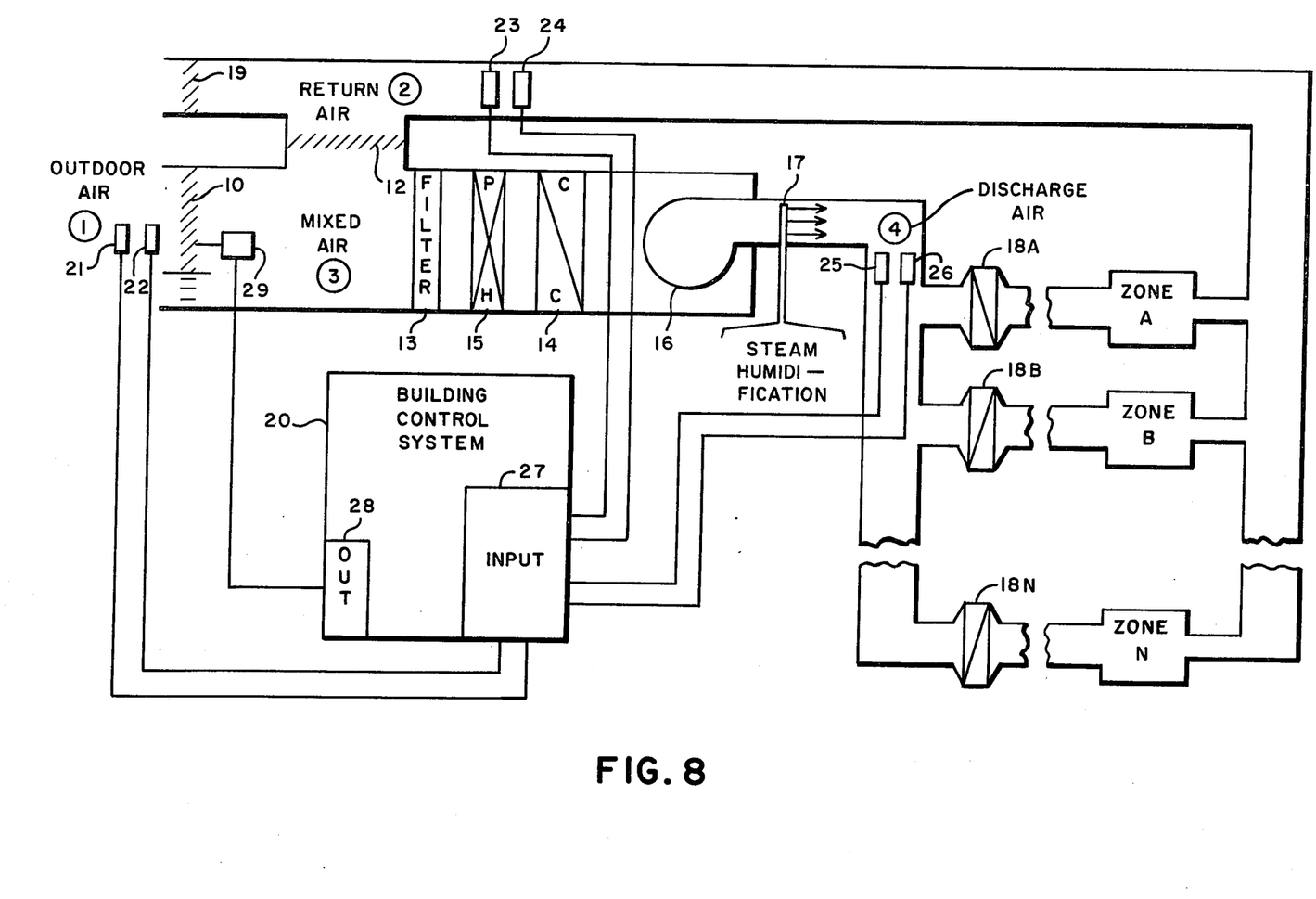
FIG. 8 is the system according to the invention for controlling the outdoor air damper at its optimum position.

FIG. 8 shows a system to control an air conditioning system such as shown in FIG. 1. Like reference numerals are used to designate like elements in FIGS. 1 and 8. A building control system, 20, receives inputs from the outdoor temperature sensor 21 and outdoor moisture content sensor 22, return air temperature sensor 23 and return air moisture content sensor 24 and discharge air temperature sensor 25 and discharge air moisture content sensor 26 into the input portion 27 of system 20. System 20 provides an output from its output portion 28 to a damper 10 and return air damper 12. The fan 16 forms a discharge means and the cooling coil 14, humidifier 17 and/or preheat coil 15 form air treatment means.

The building control system 20 may be a Honeywell Delta 2500 which has a computer, e.g. the Honeywell H316, to control the programing and functioning of a building air conditioning system. The building control system 20 receives the temperature and moisture content inputs from sensors 21–26 and iteratively computes the total heat energy input into the system, Q, for each position $\alpha$ of damper 10 from its minimum position to its fully open maximum position. It then selects the damper position requiring the lowest total energy input associated therewith and drives motor 29 until the damper 10 is set in such position.

The specific placement of the sensors is not especially critical to the operation of the system provided they relate sufficiently to the conditions of the outdoor air, return air and discharge air, discharge air being defined as the air supplied to the reheat coils or, in the case of a variable volume system, the air supplied to the zone dampers. Moreover, the system 20 may be a hard wire calculator rather than a programmable computer and designed to specifically calculate and select the optimum outdoor damper position necessary to maintain the discharge air conditions.

Although not shown herein, the discharge air conditions of temperature and humidity, as controlled by the preheat coil, if used, the cooling coil and the humidifier, can be selected so that the zone requiring the least amount of reheat will be satisfied from the conditions of the discharge air alone, i.e. the reheat coil associated with that zone will not be operated at all. Such a system is shown in my copending application Ser. No. 537,619 filed Dec. 30, 1974.

Moreover, it may not be necessary to measure each point but rather that point may be assigned a value dependent upon a selected function. For example, the moisture content of the discharge air can be calculated as a function of the moisture content of the return air less a constant $\Delta$. Thus, $W_4 = W_2 - \Delta$.

Figure 9:
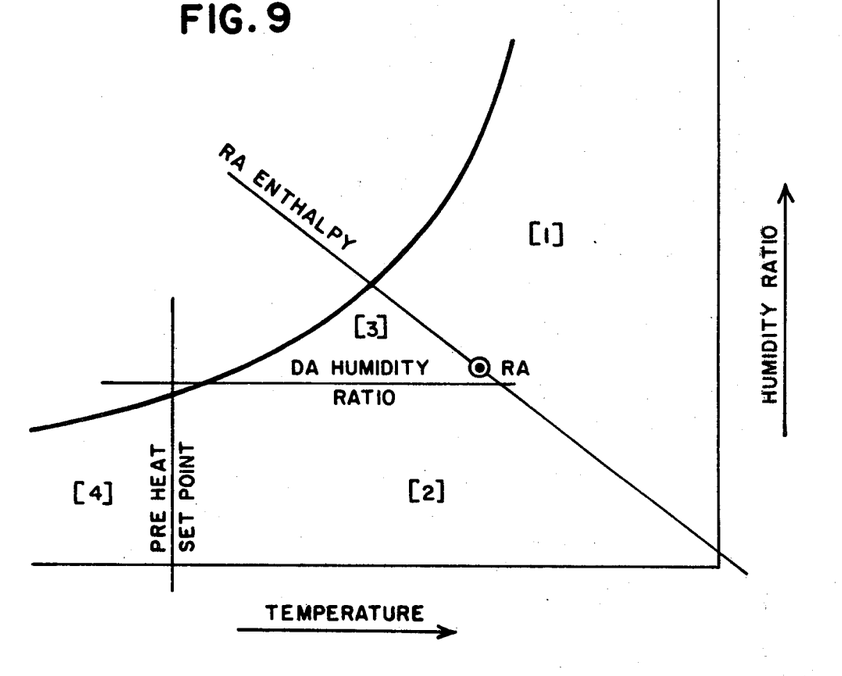
FIG. 9 shows a psychrometric chart relating to various regions of operation of the outdoor air damper.

There are constraints which the building control system 20 utilizes to control the outdoor air damper motor 29. First, whenever the outdoor air enthalpy is higher than the return air enthalpy, the damper is adjusted to its minimum position. Second, whenever the outdoor enthalpy is less than the return air enthalpy, and the outdoor air moisture content is higher than the desired discharge air moisture content, 100 percent of outdoor air is used. Third, whenever a pre-heat coil is present in this system to provide freeze protection for the cooling coil, the outdoor air damper should be set to a minimum position when the outdoor air dry bulb temperature falls below a predetermined minimum. Four, select the minimum energy consumption only for the cases that the moisture content of the mixture of the outdoor air and return air is less than or equal to the moisture content of the discharge air. These above constraints subdivide the psychrometric chart as shown in FIG. 9.

Region 1 presents the first restraint where the outdoor enthalpy is higher than the return air enthalpy. In region 1, therefore, only minimum outdoor air used. Region 3 represents constraint number 2 where the outdoor air enthalpy is less than the return air enthalpy but where the outdoor air moisture content is higher than the desired discharge air moisture content. In region 3, 100 percent outdoor air is used. Region 4 represents constraint number 3 where, when a pre-heat coil is used in this system, the outdoor air damper position is set at a minimum when the outdoor air dry bulb temperature is a minimum. In region 4, minimum outdoor air is used. Region 2 represents the remaining portion of the chart and is a combination of the first through the fourth abovenoted constraints. This is the region in which the position of the outside air damper is selected to minimize the total energy input into the building air conditioning system.

Figure 10A:
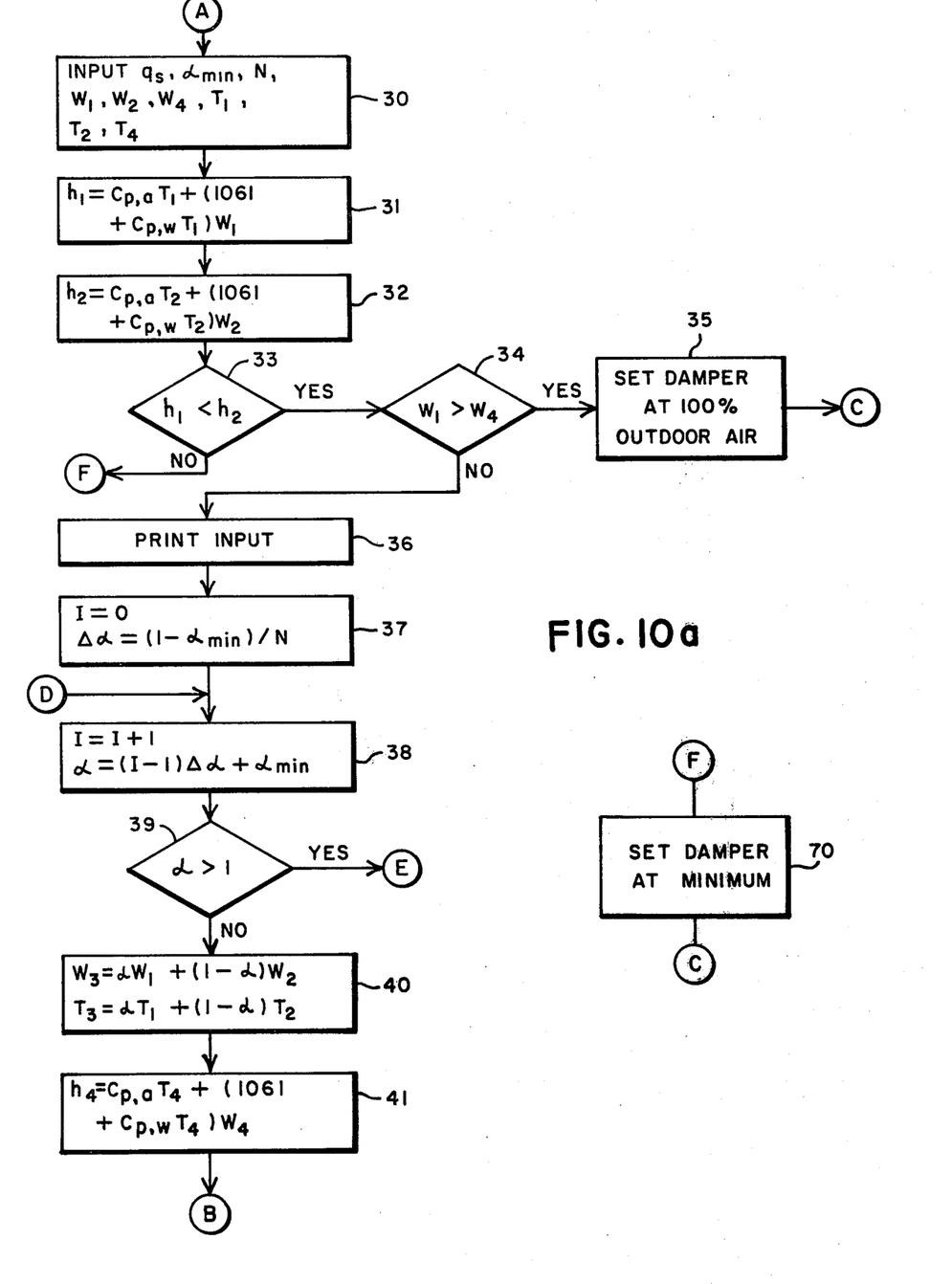
FIG. 10a and 10b show a flow-chart of the method to ascertain the damper position requiring the lowest total energy input.
Figure 10B:
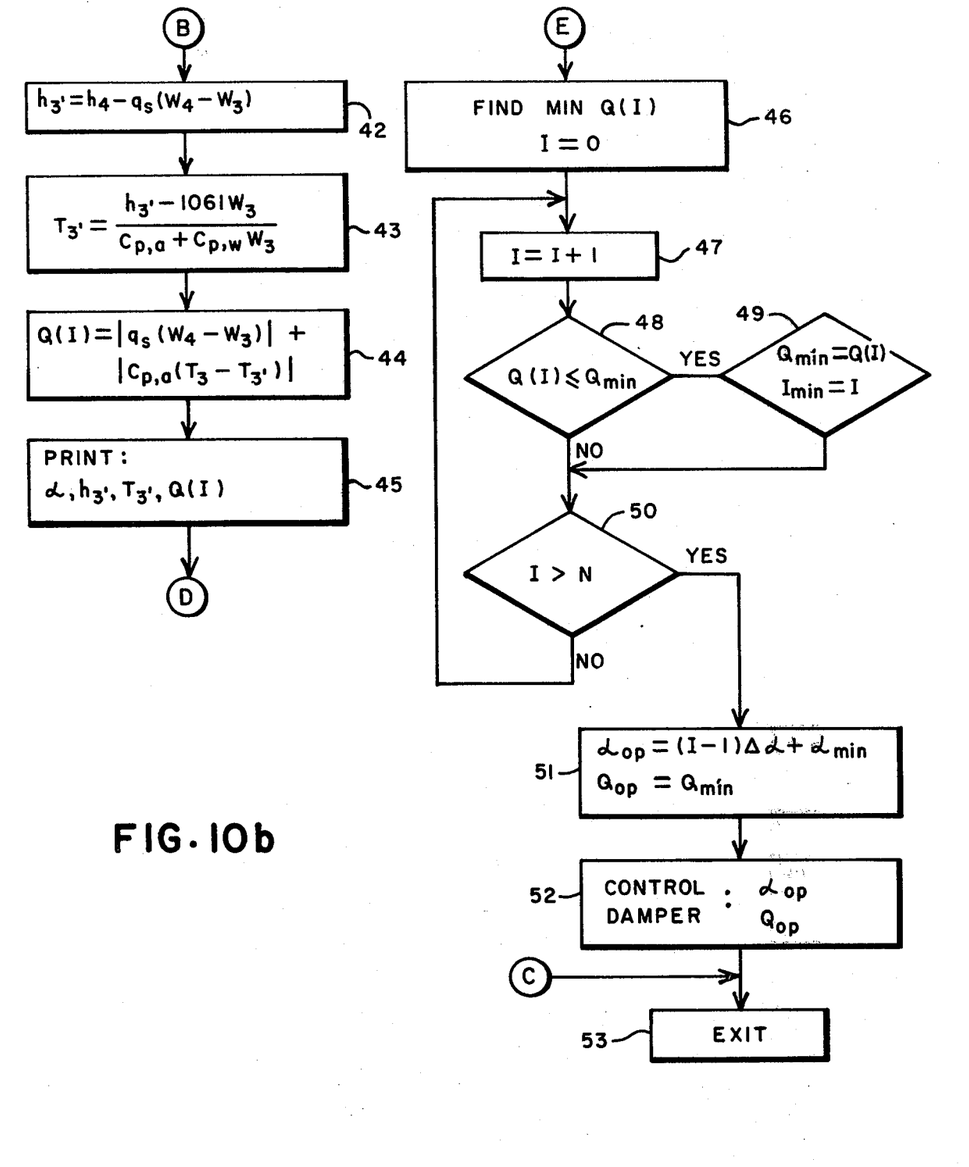

FIG. 10 is a flow-chart of the program used by the building control system 20 of FIG. 8 to select the damper position requiring the minimum total energy input into the system to maintain the conditions of the discharge air. The program begins at 30 by feeding into the calculating apparatus values for $q_s$, the heat content of one pound of steam at a given pressure, $\alpha min$ which is the minimum position of the damper at which it is operated, and N which is the number of damper positions for which the total energy input is to be calculated. The measured parameters of moisture content of the outdoor air $W_1$, return air $W_2$ and discharge air $W_4$ and the temperature of the outdoor air $T_1$, return air $T_2$ and discharge air $T_4$ are also fed into the calculating apparatus. The enthalpies of the outdoor air and return air are next calculated at steps 31 and 32. If the enthalpy of the outdoor air is not less than the enthalpy of the return air, as determined at step 33, the damper is set for admitting minimum outdoor air, at step 70 and the program is exited.

If the enthalpy of the outdoor air is less than the enthalpy of the return air, the program proceeds to the next step, 34. If, at step 34, the moisture content of the outdoor iar is greater than the moisture content of the discharge air, the outdoor air damper is operated at its 100 percent open position and the program exits at B; if the outdoor air moisture content is less than that of the discharge air, the program proceeds to step 36 where the inputs are printed if it is desired to display this information in this manner.

The function I, in step 37, is defined as that function by which $\alpha$, the outside air damper position, is incremented. Thus, initially I is set to 0 and $\Delta\alpha$ is determined. In step 38, I is incremented by 1 and $\alpha$ is calculated. In step 39, if $\alpha$ is greater than 1, the program proceeds to a subroutine which is discussed hereinafter. If $\alpha$ is less than 1, the program proceeds to determine the moisture content of the mixed air from the moisture contents of the return air and of the outdoor air and to determine the temperature of the mixed air at step 40 from the temperatures of the return air and of the outdoor air.

After the moisture content of the mixed air is calculated, the enthalpy $h_4$, i.e. the enthalpy of the discharge air, and the enthalpy $h_{3'}$, i.e. the enthalpy of the mixed air, are determined at steps 41 and 42. The temperature $T_3$, of mixed air is next calculated at step 43 and, at step 44, the energy input for that particular value of I, i.e. Q (I) is next determined. In step 45, the values of $\alpha$, $h_{3'}$, $T_{3'}$ and Q (I) are printed and the program is returned to step 38 where I is again incremented by 1 and the process is repeated until $\alpha$ becomes larger than 1.

When $\alpha$ becomes larger than 1, the computer next goes to step 46 to find the minimum total energy input. I is set to zero and in step 47 is incremented by 1. At step 48, $Q_{min}$ is first set at an arbitrary but large figure and Q(I) is compared to $Q_{min}$. If Q(I) is larger, the program proceeds to step 50. If Q(I) is smaller, Q(I) becomes the new $Q_{min}$ at step 49 and the program proceeds to step 50. In this manner, all values of Q(I) are compared to one another until I becomes larger than N and the program proceeds to step 51. When I is greater than N, $Q_{opt}$ and $\alpha_{opt}$ are defined in the step 51 and the program then proceeds to step 52 to control the damper at $\alpha_{opt}$ and then the program exits at step 53.

The equations set out above as well as the flow-chart make it clear that the primary functions to be determined are the enthalpies of the outdoor air, return air and discharge air. It becomes apparent therefore, that there are a variety of methods to determine enthalpy. For example, the wet bulb temperature may be measured to produce a representation of the temperature and moisture content of air or to give a representation directly of enthalpy. Thus, a variety of sensors may be used to determine the parameters necessary to solve the pertinent equations, and the program to solve the equations must be adjusted to facilitate the particular sensors chosen.

Figure 11A:
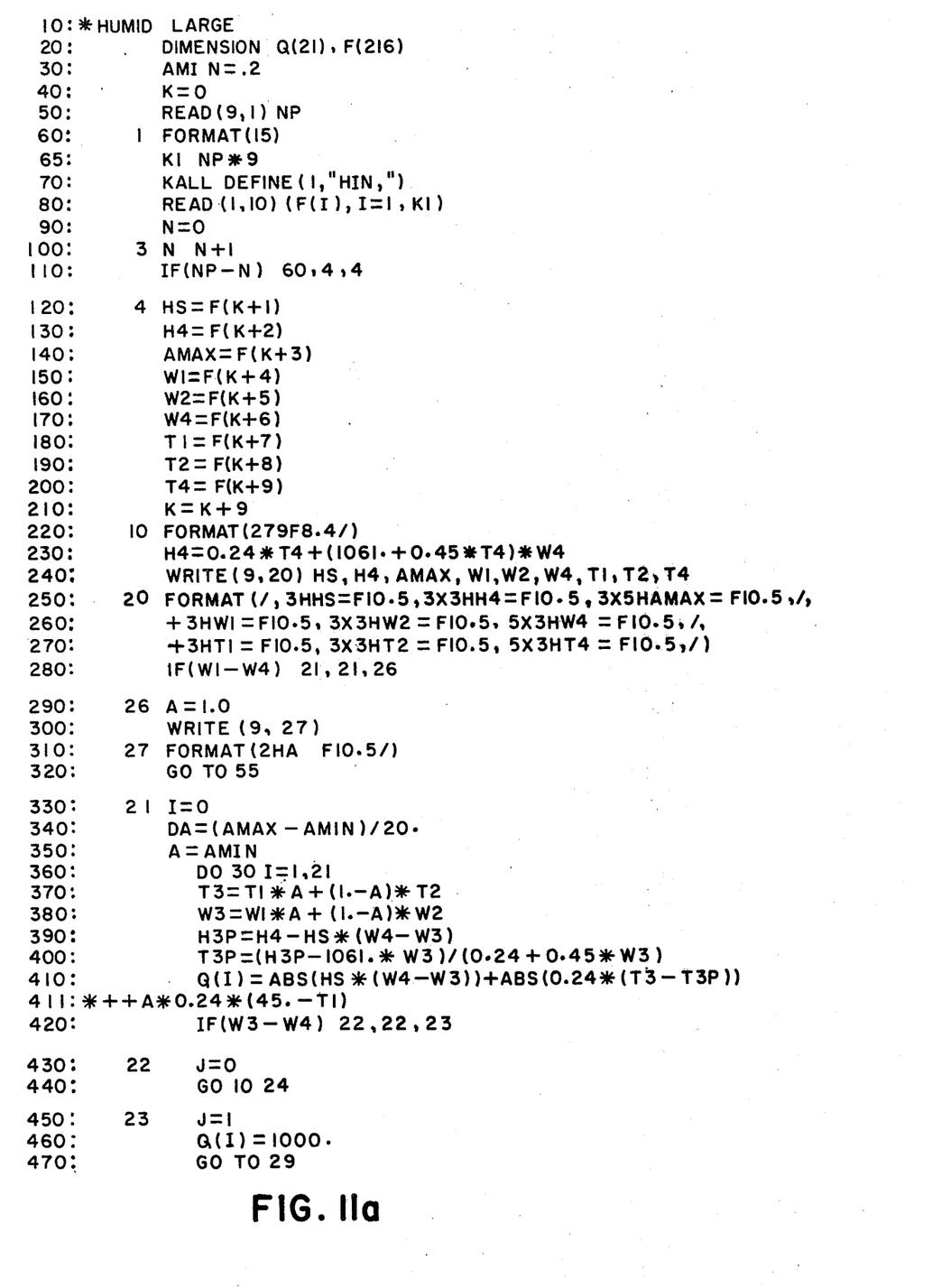
FIGS. 11a and 11b show a computer program for performing the functions of the flow-chart of FIGS. 10a and 10b in Fortran.
Figure 11B:
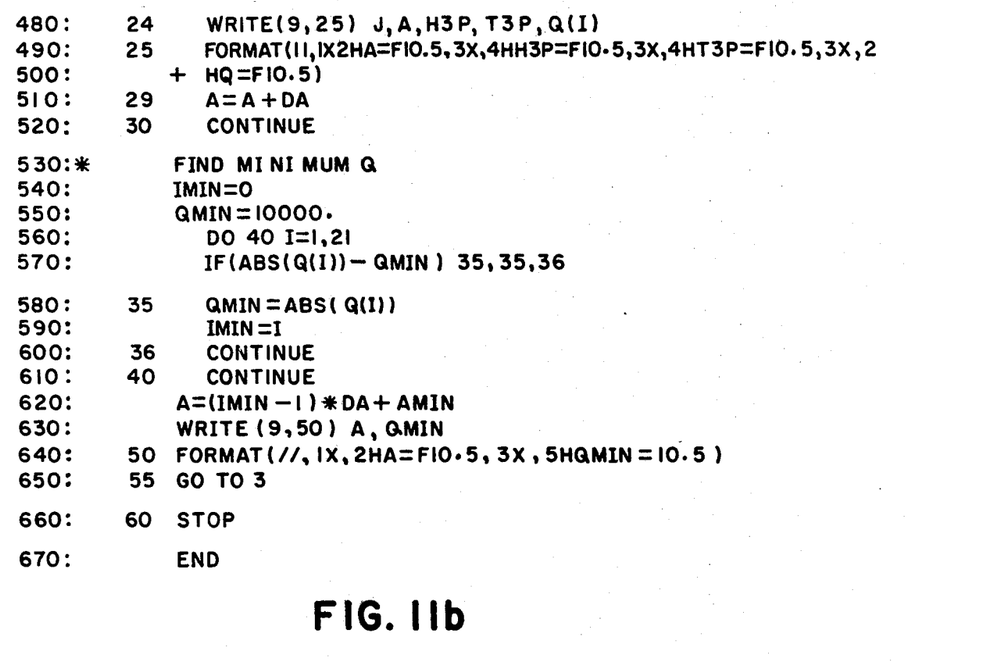

FIG. 11 shows the computer program which can be utilized to determine the damper position requiring the minimum total energy input to establish and maintain space conditions. As noted above, the control mechanism 20 can be hard wired apparatus but the preferred embodiment uses a computer.

When a pre-heat coil is not used, the region 2 and the region 4 in FIG. 9 merge and region 4 will disappear. The program shown in FIGS. 10a, 10b and 11 was constructed assuming a system without a pre-heat coil. The program will, of course, have to be modified if a pre-heat coil is used.

Figure 12:
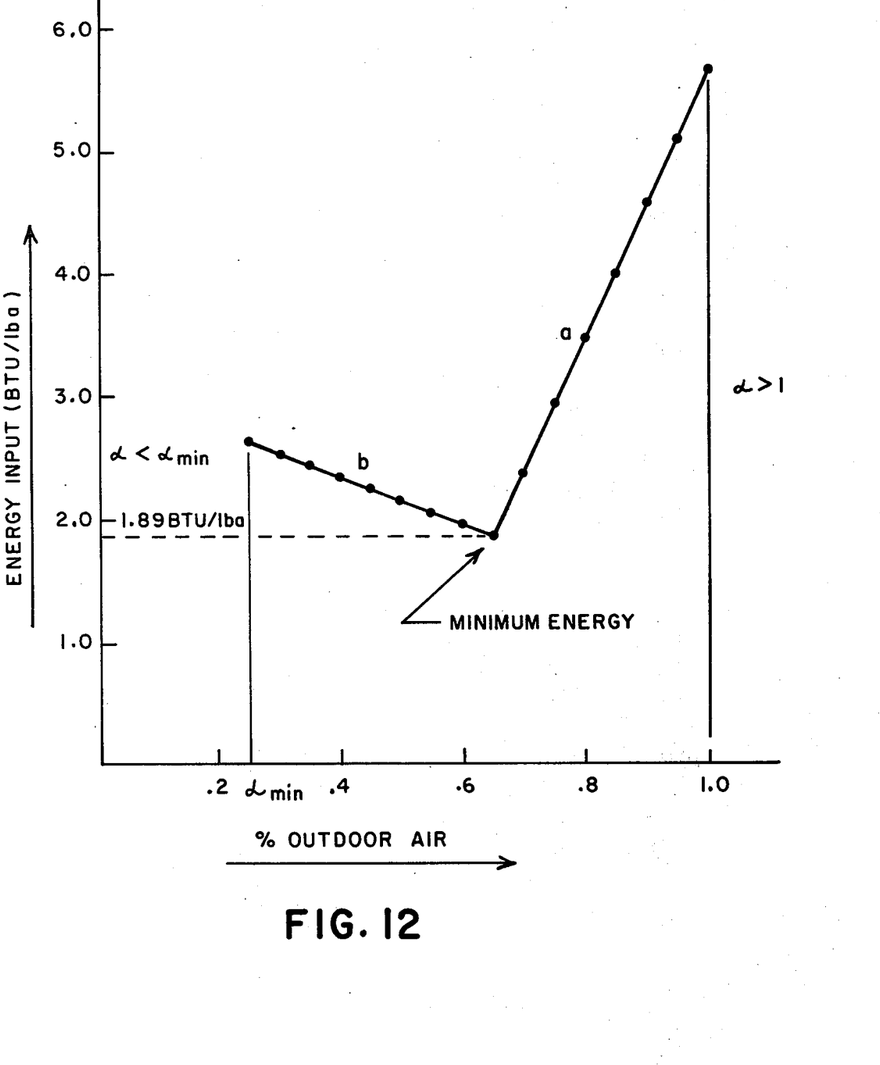
FIG. 12 depicts the effect of damper position on the total energy input.

FIG. 12 is an illustration of an example problem having the following conditions:
    Outdoor air conditions:

$W_1 = 0.0004, T = 50°$ F
Return air conditions:

$W_2 = 0.0008, T_2 = 78°$ F
Discharge air conditions:

$W_4 = 0.007, T_4 = 60°$ F

The graph in FIG. 11 shows that the minimum energy input to the system requires 1.89 PTU per 1 lb. of air at an outdoor damper position of 65% of its maximum. It is interesting to note that, at 100% of outdoor air, 5.66 BTU per 1 lb. of air would be required which is three times more than the minimum energy.

Figure 13:
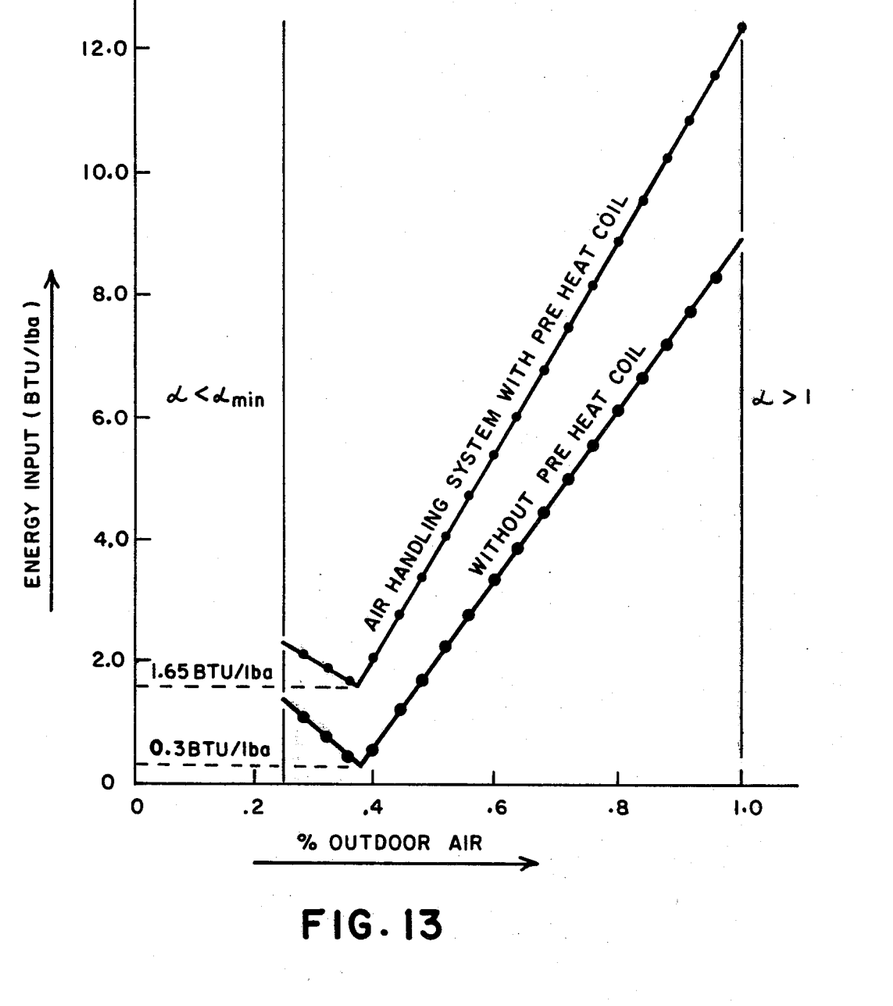
FIG. 13 shows a comparison of the total energy input verses damper position with a pre-heat coil and without a preheat coil.

FIG. 13 is a graph showing a comparison of the damper position requiring the lowest total energy input into the system when a pre-heat coil is used and when a pre-heat coil is not used. Assume the following conditions:

Outdoor air conditions:

$W_1 = 0.003, T_1 = 30°$ F
Return air conditions:
$W_2 = 0.005, T_2 = 78°$ F
Discharge air conditions:
$W_4 = 0.0045, T_4 = 60°$ F The energy input for a system without a pre-heat coil is first determined by the equation:

$$Q = C_{p,a}(T_3 - T_3') + q_s(W_4 - W_3).$$

The energy input into a system with a pre-heat coil is determined by the following function:

$$Q = C_{p,a}(T_3 - T_3') + q_s(W_4 - W_3) + C_{p,a}(45 - T_1)$$

where 45 is the set point temperature in Fahrenheit degrees of the pre-heat coil.

The results in FIG. 13 show that the desired mixture in both cases is 38 percent outdoor and 62 percent return air but that the heat input into the system without the pre-heat coil is over 5 times less than that of the system with the pre-heat coil.

The embodiments of the invention in which an exclusive property or right is claimed are defined as follows:

1. In an air conditioning control system for establishing a desired set of conditions for the air discharged to at least one zone, said system requiring a total energy input to establish said set of conditions, said system having a source of return air and return air damper means, a source of outdoor air and outdoor air damper means, means for mixing return air and outdoor air, air treatment means for treating the mixed air and discharge means for discharging treated air to at least said zone, said system comprising:
   first means generating a first output dependent upon the temperature of the outdoor air;
   second means for generating a second output dependent upon the temperature of the return air;
   third means for generating a third output dependent upon the temperature of said discharge air;
   fourth means for generating a fourth output dependent upon the moisture content of said outdoor air;
   fifth means for generating a fifth output dependent upon the moisture content of the return air;
   sixth means for generating a sixth output dependent upon moisture content of said discharge air;
   control means connected to said first, second, third, fourth, fifth and sixth means for generating an output dependent upon the first, second, third, fourth, fifth and sixth outputs indicative of the position of the outdoor air damper means requiring the lowest total energy input to support said desired conditions; and,
   damper means positioning means connected to receive said output from said control means and adapted to operate said outside air damper to said position requiring the lowest total energy input.

2. The air conditioning control system of claim 1 wherein said control means comprises a computer means having a program therein for computing the total energy input into the system for each of a predetermined number of outdoor damper means positions, for determining the lowest total energy input to satisfy said set of conditions and for selecting the outdoor air damper means position resulting in said lowest total energy input.

3. The air conditioning control system of claim 2 wherein said computer means comprises means to generate an output adapted to operate said outdoor air damper means at a minimum position when the enthalpy of the outdoor air is greater than the enthalpy of the return air.

4. The air conditioning control system of claim 3 wherein said computer means comprises means to generate an output adapted to operate said outdoor air damper means to a fully open position when the enthalpy of the outdoor air is less than the enthalpy of the return air and moisture content of the outdoor air is greater than the moisture content of the discharge air.

5. The air conditioning control system of claim 1 wherein said computer means comprises means for generating an output adapted to operate said outdoor air damper means at said minimum position when the dry bulb temperature of said outdoor air is below a pre-set minimum.

6. The air conditioning control system of claim 5 wherein said computer program comprises means for generating an output adapted to operate said outdoor air damper means at its fully open position when the enthalpy of the outdoor air is less than the enthalpy of the return air and the moisture content of the outdoor air is greater than the moisture content of the desired discharge air.

7. The air conditioning control system of claim 6 wherein said first, second, and third means comprise first, second and third temperature sensors respectively and said fourth, fifth, and sixth means comprise first, second, and third humidity sensors respectively.

8. A method of air conditioning control for establishing a desired set of conditions for the air discharged to at least one zone, said system requiring a total energy input to establish said set of conditions, said system having a source return air and return air damper means, a source of outdoor air and outdoor air damper means, means for mixing return air and outdoor air, air treatment means and discharge means for discharging treated air to at least said zone, the method comprising:
   calculating the position of the outdoor air damper means requiring the lowest total energy input to support said desired conditions based upon the temperature and humidity conditions of the outdoor air, return air and discharge air; and,
   controlling said outdoor air damper means at said position requiring the lowest total energy input.

9. The method of claim 8 wherein said step of calculating said outdoor air damper means position includes the steps of determining the temperature of the outdoor air, return air and discharge air and determining the moisture content of outdoor air, return air and discharge air.

10. The method of claim 9 wherein said step of calculating the outdoor air damper means position requiring the lowest total energy input includes the step of iteratively calculating the total energy input for each desired incremental damper position.

11. The method of claim 10 wherein said step of calculating the outdoor air damper means position requiring the lowest total energy input further includes the step of selecting the damper position requiring the lowest total energy input.

12. The method of claim 11 wherein said step of calculating the outdoor air damper means position requiring the lowest total energy input comprises the further step of controlling said outdoor air damper means at its fully open position when the enthalpy of the outdoor air is less than the enthalpy of the return air and the moisture content of the outdoor air is higher than the moisture content of the desired discharge air.

13. The method of claim 11 wherein said step of calculating the outdoor air damper means position requiring the lowest total energy input includes the further step of controlling said outdoor air damper means at a minimum position when the enthalpy of the outdoor air is higher than the enthalpy of the return air.

14. The method of claim 13 wherein said step of calculating the outdoor air damper means position requiring the lowest total energy input comprises the further step of controlling said outdoor air damper means at its fully open position when the enthalpy of the outdoor air is less than the enthalpy of the return air and the moisture content of the outdoor air is higher than the moisture content of the desired discharge air.

15. The method of claim 14 wherein the step of calculating the outdoor air damper means position requiring the lowest total energy input comprises the further step of operating said outdoor air damper means at a minimum position, in a system which utilizes a pre-heat coil, when the dry bulb temperature of the outdoor air is below a preset minimum.

16. In an air conditioning control system for establishing a desired set of conditions for the air discharged to at least one zone, said system requiring a total energy input to establish said set of conditions, said system having a source of return air and return air damper means, a source of outdoor air and outdoor air damper means, means for mixing return air and outdoor air, air treatment means for treating the mixed air and discharge means for discharging treated air to at least said zone, said system comprising:
control means for generating an output dependent upon the enthalpies of the outdoor air, return air and discharge air, said output representative of the position of the outdoor air damper means requiring the lowest total energy input to support said desired set of conditions; and,
damper means positioning means connected to receive said output from said control means and adapted to operate said outdoor air damper means to said position requiring the lowest total energy input.

17. The air conditioning system of claim 16 wherein said control means comprises means for generating an output to said damper means positioning means adapted to operate said outdoor air damper means to a minimum position when said outdoor air enthalpy is greater than said return air enthalpy.

18. The air conditioning control system of claim 17 wherein said control means comprises means for providing a signal dependent upon the moisture content of outdoor air and discharge air and means for generating an output to said damper means positioning means adapted to operate said outdoor air damper means to a fully open position when said outdoor air enthalpy is less than said return air enthalpy and said outdoor air moisture content is greater than said discharge air moisture content.

* * * * *